United States Patent
Wolf et al.

(10) Patent No.: US 10,428,248 B1
(45) Date of Patent: Oct. 1, 2019

(54) COMPOSITIONS, MATERIALS, AND METHODS FOR ENHANCING 3D PRINTER PLATFORM ADHESION AND/OR REDUCING WARPAGE IN PRINTED PARTS

(71) Applicant: WOLF & ASSOCIATES, INC., Costa Mesa, CA (US)

(72) Inventors: Erick Packard Wolf, Corona del Mar, CA (US); Courtney Ford, Costa Mesa, CA (US); Miodrag Micic, Costa Mesa, CA (US)

(73) Assignee: WOLF & ASSOCIATES, INC., Costa Mesa, CA (US)

( * ) Notice: Subject to any disclaimer, the term of this patent is extended or adjusted under 35 U.S.C. 154(b) by 172 days.

(21) Appl. No.: 15/290,976

(22) Filed: Oct. 11, 2016

Related U.S. Application Data

(60) Provisional application No. 62/240,428, filed on Oct. 12, 2015.

(51) Int. Cl.
| | | |
|---|---|---|
| *C09J 139/06* | (2006.01) | |
| *C08L 5/00* | (2006.01) | |
| *C08L 31/04* | (2006.01) | |
| *C08L 33/02* | (2006.01) | |
| *C08L 39/06* | (2006.01) | |
| *C08L 89/00* | (2006.01) | |
| *C08L 89/06* | (2006.01) | |
| *C09J 105/00* | (2006.01) | |
| *C09J 131/04* | (2006.01) | |
| *C09J 133/02* | (2006.01) | |
| *C09J 189/00* | (2006.01) | |
| *C09J 189/06* | (2006.01) | |

(52) U.S. Cl.
CPC ............... *C09J 139/06* (2013.01); *C08L 5/00* (2013.01); *C08L 31/04* (2013.01); *C08L 33/02* (2013.01); *C08L 39/06* (2013.01); *C08L 89/00* (2013.01); *C08L 89/06* (2013.01); *C09J 105/00* (2013.01); *C09J 131/04* (2013.01); *C09J 133/02* (2013.01); *C09J 189/00* (2013.01); *C09J 189/06* (2013.01)

(58) Field of Classification Search
CPC ...... C09J 139/06; C09J 131/04; C09J 133/02; C09J 189/00; C09J 189/06; C08L 5/00; C08L 31/04; C08L 33/02; C08L 39/06; C08L 89/00; C08L 89/06
USPC .......................................................... 524/22
See application file for complete search history.

(56) References Cited

U.S. PATENT DOCUMENTS

2001/0050031 A1 * 12/2001 Bredt .................... B29C 41/003
106/162.9

* cited by examiner

*Primary Examiner* — Ronald Grinsted
(74) *Attorney, Agent, or Firm* — Knobbe Martens Olson & Bear LLP

(57) ABSTRACT

Disclosed herein are adhesive compositions for coating the print-bed of a 3D printer print platform. The compositions comprise a polyelectrolyte or mixture of polyelectrolytes with different additives and preservatives in a solvent. Also disclosed herein are methods of manufacturing the adhesive compositions.

8 Claims, 1 Drawing Sheet

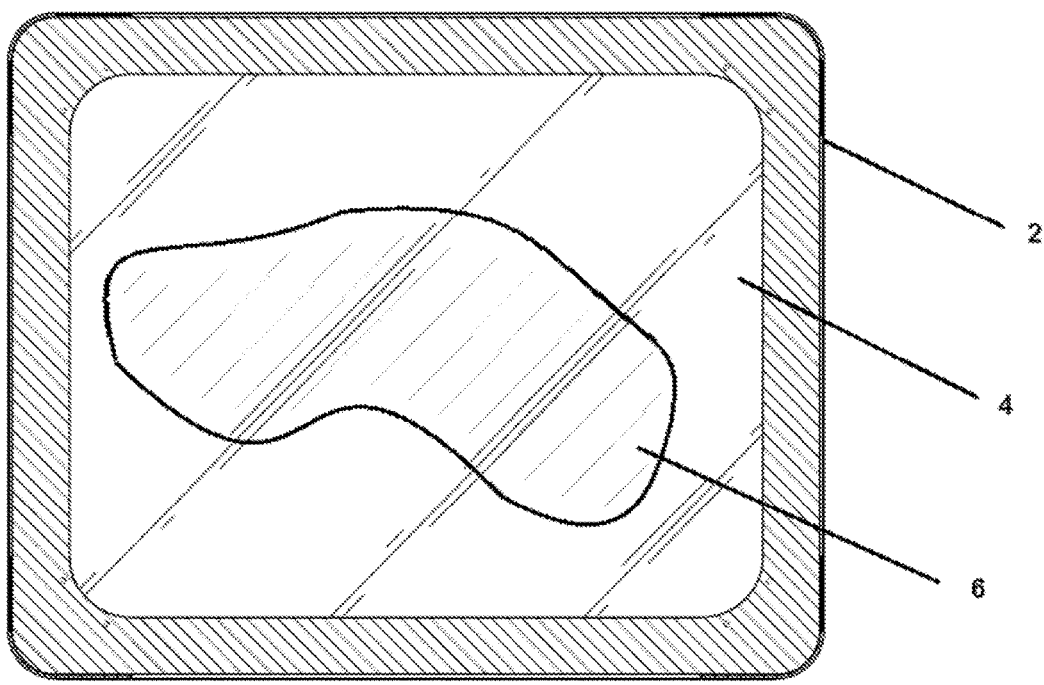

COMPOSITIONS, MATERIALS, AND METHODS FOR ENHANCING 3D PRINTER PLATFORM ADHESION AND/OR REDUCING WARPAGE IN PRINTED PARTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present application relates to the field of printing of three dimensional (3D) objects. More particularly, disclosed herein are compositions, materials, and methods used for treating the surface of 3D printing platform on which the three dimensional (3D) object is printed. Also disclosed herein are methods of making such compositions.

BACKGROUND

Three-dimensional (3D) printing is a process used for the printing of three-dimensional objects, for example, by printing or building parts of such objects in layers. Such 3D objects may be used, for example, for prototype parts, for customized build articles, or for decorative articles. An additive manufacturing system (e.g., a fused deposition modeling (FDM) or extrusion-based additive manufacturing system) is used to build 3D objects, parts, or models from a digital representation of the 3D object using one or more additive manufacturing techniques such as layer-by-layer extrusion of a flowable part material. Generally, movement of the extrusion head with respect to the substrate is performed under computer control, in accordance with build data that represents the 3D object. The build data is obtained by initially slicing the digital representation of the 3D object into multiple horizontally sliced layers. Then, for each sliced layer, the host computer generates a build path for depositing roads of modeling material to form the 3D object. As the sequential cross-sectional layers of the 3D object are deposited on a platform they undergo curing, fusing to generate the 3d object. Generally, the printed 3D object is then separated from the platform, or print bed.

Acrylonitrile Butadiene Styrene (ABS), Polylactic Acid (PLA), and Polycarbonate (PC) are examples of materials used to build the 3D objects. ABS, PLA, and PC may be applied to a heated 3D printing surface through an additive process to form the 3D printed parts. ABS, PLA, PC or other materials often do not adhere properly to the printing surface made of glass, ceramic or the like, which may result in lifting or warpage.

SUMMARY

Provided herein are compositions, devices and methods for promoting adhesion between a 3D printed material and a print platform.

In some embodiments, a composition for promoting adhesion between a 3D printed material and a print platform can comprise 0.05-7 wt. % urea, 1-15 wt. % gelatin, 1-8 wt. % acetic acid, 58-99 wt. % water; and 0.1-5 wt. % polyvinylpyrrolidone (PVP). In some embodiment, the composition can comprise 1-4 wt. % urea, 3-9 wt. % gelatin, 2-6 wt. % acetic acid, 84-96 wt. % water, and 0.5-3 wt. % polyvinylpyrrolidone (PVP).

In some embodiments, a composition for promoting adhesion between a 3D printed material and a print platform can comprise 25-40 wt. % polyvinyl acetate, 50-75wt. % water, and 1-10 wt. % water soluble polyamide. In some embodiments, the composition can comprise 28-35 wt. % polyvinyl acetate, 60-70 wt. % water, and 1.5-4 wt. % water soluble polyamide. In some embodiments, the water soluble polyamide is derived from polymerization of a caprolactam monomer and an amine monomer.

In some embodiments, a composition for promoting adhesion between a 3D printed material and a print platform can comprise 0.1-8 wt. % polyvinylpyrrolidone (PVP), 1-9 wt. % acetic acid, 85-99 wt. % water, and 0.1-7 wt. % gum arabic. In some embodiments, the composition can comprise 0.2-1 wt. % polyvinylpyrrolidone (PVP), 3-7 wt. % acetic acid, 90-97 wt. % water, and 0.5-2 wt. % gum arabic.

In further embodiments, the composition can comprise an additive selected from the group consisting of a binder, an expander, a hydolysing agent, a rheology modifier, an adhesive strength modifier, a release modifier, a cross-linking agent, a free radical trapping agent, a stabilizer, a colorant, a fragrance, an acid, guar gum, locust bean gum carob bean gum, xanthan gum, agar, a gelation agent, and an oligosaccharide.

In some embodiments, the composition can comprise an additive selected from the group consisting of a binder, an expander, a hydolysing agent, and an oligosaccharide.

In some embodiments, a print bed in contact with an adhesive composition provided herein, can be provided. In further embodiments, the print bed can comprise a hydrophilic material.

In some embodiments, a print bed in contact with an adhesive composition provided herein can be printed with a print material. In further embodiments, a printed material is a polymeric material. In further embodiments, the adhesive composition can be selected according to the print material.

BRIEF DESCRIPTION OF THE DRAWINGS

FIG. 1 depicts an embodiment of a 3D printer platform in contact with an adhesive composition.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. The embodiments of the present disclosure, as generally described herein, and illustrated in the figures, can be arranged, substituted, combined, and designed in a wide variety of different configurations, all of which are explicitly contemplated and made part of this disclosure.

Provded herein are compositions and methods for treating the surface of the print platform of a 3D printer on which the print-material layers of the 3D object are deposited. The composition may be in the form of a solution that can be easily applied to the print platform with an applicator brush. The composition is formulated to bind the print-material layer of the 3D object to the print surface as the object is being formed and yet allow the object to be easily dismounted from the print surface with minimal effort. The print surface can be made of glass, ceramic material, or the like.

Certain embodiments of the present disclosure are directed to compositions, materials and methods for enhancing 3D printer platform adhesion and/or reducing warpage in printed parts by affixing a printed object to a print bed. In further embodiments, damage to the print bed and/or printed object can be reduced during removal of the printed object, compared to other adhesives.

Hereinafter, specific embodiments of the present disclosure will now be described in more detail. The embodiments may, however, be represented in many different forms and should not be construed as being limited to the specific embodiments set forth herein. Rather, these specific embodiments are provided so that this disclosure will be thorough and complete, and will fully convey the scope of the embodiments to those skilled in the art.

In one embodiment, a chemical composition formulated for promoting proper adhesion between a 3D printing platform, such as, for example, a heated glass surface, and a printed 3D object made of polymeric materials is provided. Proper adhesion, in this context, refers to contact between a printed object, such as a 3D printed object, and a printing surface, such as a print bed, such that the printed object can be separated from the print bed without substantially damaging either the printed object or the print bed. In some embodiments, compositions provided herein, when applied to a print bed, can prevent or reduce warpage of a printed object compared to an object printed without an adhesive. By affixing printed material to a brint bed, distortion of the printed object, which may be caused by physical process, such as cooling or degassing, or chemical process, such as cross-linking of the printed material, is reduced. Some embodiments provided herein provide proper adhesion between printed object and print bed while reducing warpage of a printed object.

FIG. 1 depicts an embodiment including a printer platform 2 having a print bed 4. A printer platform 2 can be part of a 3D printing system configured to deposit a printed material on printer platform 2. Generally, a printed material is deposited on print bed 4. In the depiction of FIG. 1, a composition 6 according to the disclosure is in contact with the print bed 4. Printed material can be applied to at least a portion of print bed 4 in contact with composition 6. In some embodiments, composition 6 promotes adhesion between a printed object and print bed 4. In some embodiments, a composition 6 can be in contact with at least a portion of print bed 4.

In some embodiments, an adhesive composition for treating the print surface of a 3D printer to promote adhesion and yet allow easy dismount of printed objects is provided. The adhesive composition can comprise a polyelectrolyte, or a mixture of polyelectrolytes.

In some embodiments, an adhesive composition can comprise a polyelectolyte selected from polyvinylacetate (PVA), polyacrylic acid, polyvinyloxide, polyethylene oxide (PEO), polyvinyl alcohol, polyvinylpyrrolidone (PVP), polyacrylate, polyacrylamide, polyalkylacrylates, such as, for example, poly(methyl methacrylate), polysaccharides, glycoproteins, collagens and hydrolysates of collagens such as gelatins, nylons, for example, aliphatic or aromatic polyamides, and combinations thereof. A polyelectrolyte can be derived from, or be, a natural plant or animal resin. In some implementations the adhesive composition further comprises a solvent, an additive, and/or a preservative. The print surface can be made of a hydrophilic material, for example, glass or ceramic, and the composition can be in the form of a solution or dispersion, that generally can be easily applied to the print surface.

Generally, PVA, when provided, may be present as a mixture with polyvinylalcohol, due to deliberate or circumstantial hydrolysis. PVA can be provided as an aqueous suspension, for example, commercial wood glue such as supplied by, for example, Elmers™. In some embodiments, a polyelectrolyte such as, for example, polyacrylic acid, can be present, or partially present, as a salt. In some embodiments, polyacrylic acid is present as a salt with a monovalent cation. In some embodiments, a monovalent cation can be selected from ammonium or an alkali metal, for example, lithium, sodium, or potassium. A nylon can be a water soluble polyamide. A water soluble polyamide can be derived from polymerization of a caprolactam monomer and an amine monomer.

In one embodiment, a chemical composition formulated for promoting proper adhesion between a 3D printing platform, such as a heated glass surface, and a printed 3D object made of materials including polymers such as, for example, ABS or PLA or PC is provided. The composition may be an adhesive composition and may include: a polyelectrolyte or mixture of two or more polyelectrolytes in about 1 wt. % to about 30 wt. %, about 1 wt. % to about 50 wt. %, or about 1 wt. % to about 90 wt. %, based on the total weight of the adhesive composition.

In some embodiments the composition may include: a polyelectrolyte or mixture of two or more polyelectrolytes in about 10 wt .% to about 20 wt. %, about 5 wt. % to about 15 wt. %, or about 1 wt. % to about 10 wt .% based on the total weight of the adhesive composition.

In some embodiments the polyelectrolyte can be selected from polyethylene oxide, polyvinylpyrrolidone, polyvinylacetate (PVA), polyacrylic acid, polyvinyl alcohol, polyacrylate, polyacrylamide, poly(methyl methacrylate), polysaccharides, a glycoprotein, a collagen, and a gelatin, in about 1 wt. % to about 30 wt. % based, about 1 wt. % to about 50 wt. %, or about 1 wt. % to about 90 wt. % based on the total weight of the adhesive composition.

In some embodiments the composition may include: a mixture of two or more polyelectrolytes selected from polyethylene oxide, polyvinylacetate (PVA), polyacrylic acid, polyacrylate, polyvinyl alcohol, polyvinylpyrrolidone, a polyacrylamide, a polyalkylacrylate such as, for example, poly(methyl methacrylate), a polysaccharide, a glycoprotein, a collagen and a gelatin, in about 1 wt. % to about 30 wt. %, about 1 wt. % to about 50 wt. %, or about 1 wt. % to about 90 wt. %, based on the total weight of the adhesive composition.

In some embodiments a polyelectrolyte can have molecular weight or molar mass between about 10,000 g/mol and 1,000,000 g/mol, about 10,000 g/mol and 50,000 g/mol, or about 30,000 g/mol and 60,000 g/mol number average molar mass ($M_n$).

In some embodiments the compositions described herein further comprise a solvent. A solvent as provided herein need not dissolve every component, and need not completely dissolve each component, of a composition. One or more components of a composition may be suspended, dispersed, or form a colloid, in a solvent. A solvent may include more than one chemical constituent molecule. In some embodiments the adhesive composition may include: a solvent or mixture of two or more solvents in about 65 wt % to about 99 wt % based on the total weight of the adhesive composition.

In some embodiments the composition may include: a solvent or mixture of two or more solvents in about 50 wt % to about 99 wt %, about 70 wt. % to about 99 wt. %, about 80 wt. % to about 99 wt. %, or about 10 wt. % to about 99 wt. % based on the total weight of the adhesive composition.

Generally, a solvent provided herein can be an aqueous solvent or an organic solvent. In some embodiments, the solvent may comprise an aqueous solvent or an organic solvent, or a combination of thereof. In further embodiments, an aqueous solvent can be selected from water, distilled water, deionized water, aqueous salt solutions, and aqueous acid solutions such as, for example, aqueous acetic acid. In some embodiments, aqueous acetic acid is vinegar. In further embodiments, an organic solvent can be selected from alkanes, ethers, amides, nitriles, alcohols, ketones, esters, sulfoxides, chlorinated hydrocarbons, aromatics, terpenes, carboxylic acids, and molecules including combinations of the foregoing. In further embodiments, an organic solvent can be ethylene glycol, methyl ethyl ketone, dimethyl sulfoxide, or a combination thereof. In some embodiments, a solvent can be present in a composition in about 10 wt. % to about 99 wt. %, about 50 wt. % to about 99 wt. %, or about 65 wt % to about 99 wt %, based on the total weight of the adhesive composition. In further embodiments, an aqueous solvent can be present in a composition in about 10 wt. % to about 99 wt. %, about 50 wt. % to about 99 wt. %, or about 65 wt % to about 99 wt %, based on the total weight of the adhesive composition. In still further embodiments, an organic solvent can be present in a composition in about 10 wt. % to about 99 wt. %, about 50 wt. % to about 99 wt. %, about 65 wt % to about 99 wt %, about 1 wt % to about 25 wt %, about 5 wt % to about 25 wt %, or about 1 wt % to about 10 wt %, based on the total weight of the adhesive composition.

In some embodiments the composition may include a preservative or mixture of two or more preservatives. A preservative as provided herein may prevent digestion or decomposition of a composition or components thereof. A preservatives may be any type recognized by persons of skill in the art including antimicrobials and antioxidants. In some embodiments the composition may include a preservative or mixture of two or more preservatives in about 1 wt. % to about 10 wt. %, or about 0.01 wt. % to about 10 wt. %, based on the total weight of the adhesive composition. In yet further embodiments, a preservative may be an antimicrobial selected from benzoic acid, hydroxybenzoate, nitrite salts, nitrate salts, propionic acid, sulfur dioxide, sulfite salts, and sorbic acid. In still further embodiments, a preservative may be an antioxidant selected from ascorbic acid, BHT, gallic acid, sulfur dioxide, and tocopherols.

In some embodiments the composition may include: a preservative or mixture of two or more preservatives in about 5 wt. % to about 10 wt. %, or about 2 wt. % to about 8 wt. % based on the total weight of the adhesive composition.

In some embodiments the composition may include a preservative selected from benzoic acid, hydroxybenzoate, nitrite salts, nitrate salts, propionic acid, sulfur dioxide, sulfite salts, ascorbic acid, BHT, gallic acid, sulfur dioxide, a tocopherol, vinegar, sodium benzoate, caprylic acid, propionic acid, sorbic acid and combinations thereof in about 0.1 wt. % to about 10 wt. % based on the total weight of the adhesive composition.

In some embodiments, the composition may include a solvent active as a preservative, for example vinegar, in an amount between 10% by weight to 95% by weight.

In some embodiments the compositions described herein further comprise one or more additives. An additive as provided herein can perform any suitable function in the composition including binder, expander, hydolysing agent, rheology modification, adhesive strength modification, release modification, as a cross-linking agent or catalyst, as a free radical trapping agent, as a stabilizer (e.g., emulsifier), coloring, fragrance, gelation, or a combination of these. An additive can be a naturally occurring polysaccharide mixture such as a gum, for example, guar gum, locust bean gum, carob bean gum, xanthan gum, gum Arabic, or agar. An additive can include other naturally occurring substances such as proteins. An additive can be a sugar such as, for example, raw cane sugar, glucose, sucrose, fructose, lactose, or maltose. An additive may be a colorant, such as a dye. A colorant can be a typical dye used in industry. In some embodiments, the colorant can be, for example, water-based or alcohol-based food coloring.

A binder, when present, can provide cohesion in the adhesive composition. A binder can be, for example, gelatin or gum Arabic. A hydrolyzing agent, when present, can reduce cross-linking of cross-linkable components in the composition. A hydrolyzing agent can be, for example, urea.

In some embodiments the composition may include an additive or mixture of two or more additives in about 0.0001 wt % to about 10 wt % based on the total weight of the adhesive composition. In further embodiments, the additive can be selected from a binder, for example collagen or gelatin, an expander, a hydolysing agent, a rheology modifier, an adhesive strength modifier, a release modifier, a cross-linking agent or catalyst, a free radical trapping agent, a stabilizer (e.g., emulsifier), a colorant, a fragrance, an acid, for example acetic acid, urea, a gum, for example guar gum, locust bean gum carob bean gum, xanthan gum, gum Arabic, or agar, a gelation agent, and an oligosaccharide, for example raw sugar.

In some embodiments the composition may include an additive or mixture of two or more additives in about 0.0001 wt. % to about 15 wt. %, about 0.001 wt. % to about 5 wt. %, about 2 wt. % to about 8 wt. %, about 5 wt. % to about 15 wt. %, or about 0.0001 wt. % to about 0.1 wt. % based on the total weight of the adhesive composition. In some embodiments, an additive can be present in a trace amount.

In some embodiments the composition may include an additive selected from acetic acid, urea, a gum, for example guar gum, locust bean gum carob bean gum, xanthan gum, gum Arabic, or agar, and an oligosaccharide, for example raw sugar, a gelation agent, gelatin, urea, cross-linking controlling agent or catalyst, food coloring agent, artificial fragrants, and combinations thereof in an amount between about 0.0001 wt. % to about 10 wt. % based on the total weight of the adhesive composition.

A print material generally can be any material deposited on the print bed. Generally, the print material comprises a polymer or mixture of polymers that is flowable at an elevated temperature, and can cool to form a solid. The print material can comprise a solvent or suspending agent. The print material can further comprise one or more additives.

In some embodiments the print material deposited on the adhesive composition comprises a polylactic acid (PLA), poly(lactic-co-glycolic acid) (PLGA), acrylonitrile butadiene styrene (ABS) polymer, polycarbonate/acrylonitrile-butadiene-styrene polymer (PC/ABS), polyethylene terephthalate (PET), polycarbonate (PC), polycaprolactone (PCL), a thermoplastic elastomer (TPE) such as, for example, thermoplastic polyurethane (TPU), styrene-acrylonitrile polymer (SAN), nylon, such as, for example, nylon- 6, nylon-6,6, nylon-6T, Nylon 645, Nylon 680, 910 Alloy, water soluble polyamides, and combinations thereof, polymers of aliphatic hydrocarbon monomer units (such as alkane, alkene and alkyne monomers), such as, for example, polypropylene, polyethylene and mixtures thereof, and mixtures of the foregoing. In some embodiments, a TPE can be selected from styrenic block copolymers (TPE-s), thermoplastic olefins (TPE-o), elastomeric alloys (TPE-v or TPV), thermoplastic polyurethanes (TPU), plasticized copolyamide (PCTPE), thermoplastic copolyester, and thermoplastic polyamides. In certain embodiments, copolymers, such as graft and block copolymers, can be used as a print material. In some embodiments, a polymer can be a crystalline polymer.

In some embodiments, a method of printing a 3D object includes applying an adhesive composition, such as an adhesive solution, to the print platform of the 3D printer, the adhesive composition comprising a polyelectrolyte or a combination of two or more polyelectrolytes; optionally one or more additives; and optionally a preservative; and a solvent such as an aqueous solvent, for example water, distilled water, or deionized water, and/or an organic solvent such as, for example, ethylene glycol, methyl ethyl ketone, or dimethyl sulfoxide, and combinations thereof. The method further comprises depositing a print material layer onto the print platform wherein the print-bed is coated with the adhesive composition, such that the layer of print material adheres to the adhesive composition. In some embodiments, as the sequential build-up of the print material layers takes place to form the 3D object the 3D object continues to adhere to the adhesive composition. In further embodiments, the adhesive composition reduces warping of the printed object.

A printed material will generally be deposited on a print bed, or print platform. The surface upon which printing takes place is generally made of a hydrophilic material, which may comprise glass, ceramic material, stainless steel, fiberglass-epoxy, wood, paper, phenolics (for example, Garolite), nylon 6/6, and combinations thereof.

An adhesive composition as provided herein can be applied by any suitable method. Persons of skill in the art will understand that a suitable method of application will vary depending on a number of factors, including adhesive composition, polymer to be printed, print platform material, and restrictions imposed by a printing process. The temperature at which an adhesive composition is applied can also affect a suitable application method. In some embodiments, an adhesive composition at room temperature is applied to a print platform. In various embodiments, suitable application methods include spraying, smearing, wiping, spreading, brushing, dipping, or a combination of these.

In some embodiments the composition is selected for printing at a selected print-bed temperature. In some embodiments the composition is applied on the print platform at a print-bed temperature of about 25° C. to about 175° C., about 25° C. to about 100° C., about 100° C. to about 150° C., about 90° C. to about 130° C., or about 120° C. to about 150° C.

In some embodiments, a print bed in contact with an adhesive composition provided herein can be printed at a selected temperature. In some embodiments a layer is applied at a print-bed temperature of about 25° C. to about 175° C., about 25° C. to about 100° C., about 100° C. to about 150° C., about 90° C. to about 130° C., or about 120° C. to about 150° C.

In some embodiments, the method comprises removal of the 3D printed object by separating it from the adhesive composition on the print platform to obtain the printed 3D object. In general, adhesive compositions provided herein promote proper adhesion between a printed object and a print bed. However, in certain circumstances it may be advantageous to maintain contact between printed object and print bed, or to damage (e.g., render unusable or remove a substantial portion of) a print bed or 3d printed object during the process of separating the 3D printed object and print bed. For example, a print bed can be adhered to a 3D printed object during transportation and/or storage. A 3D printed object can be maintained in contact with the print bed during use or display. In some embodiments, the adhesion during printing, for example at a temperature during printing, is different from the adhesion under the conditions in which the printed object is removed from the print bed.

In general, a 3D printed object can be separated from a print bed by any means known in the art. These include, for example, scraping, cutting, melting, twisting, shaking, and percussing. In some embodiments the method comprises removal of the 3D objects by self-separation from the adhesive composition on printer platform during cooling of a printer platform, which, without wishing to be limited by theory, may be due to the larger differences in coefficients of thermal expansions of print platform, adhesive and 3D printed material.

In some embodiments the adhesive is selected or designed in a way that it can form and/or hold a strong adhesive bond between the print bed and 3D printed object only with an elevated bed temperature (above 40° C.). In certain embodiments, reduced adhesion upon cooling can provide a quick release of the printed object from the print bed. In some embodiments, a print bed in contact with an adhesive composition provided herein, is provided. The print bed can be a component of a 3D printing device. In further embodiments, the print bed comprises a hydrophilic material. In still further embodiments, the print bed comprises a material selected from glass, ceramic material, stainless steel, fiberglass-epoxy, wood, paper, phenolics (for example, Garolite), nylon 6/6, and combinations thereof.

In one embodiment, the composition can comprise water, polyvinylpyrrolidone (PVP), an acid, and optionally a glycoprotein or polysaccharide. In one embodiment, the composition can comprise 0.1-10 wt. % polyvinylpyrrolidone (PVP), 70-99 wt. % of ~5% aqueous acetic acid, and optionally 1-10 wt. % gum arabic. In one embodiment, the composition further comprises 0.00001-0.1 wt. % colorant. The colorant may be a water soluble colorant such as a food coloring. In a further embodiment, the composition can comprise 0.01-30 wt. % polyvinylpyrrolidone (PVP), 40-99 wt. % of about 5% aqueous acetic acid, and optionally 0.01-30 wt. % of a glycoprotein or polysaccharide. In a still further embodiment, the composition can comprise 0.1-8 wt. % polyvinylpyrrolidone (PVP), 85-99 wt. % of ~5% aqueous acetic acid, and optionally 0.1-7 wt. % gum arabic. In some embodiments, the composition can comprise 0.1-8 wt. % polyvinylpyrrolidone (PVP), 1-9 wt. % acetic acid, 85-99 wt. % water, and 0.1-7 wt. % gum arabic. In some embodiments, the composition can comprise 0.2-1 wt. % polyvinylpyrrolidone (PVP), 3-7 wt. % acetic acid, 90-97 wt. % water, and 0.5-2 wt. % gum arabic.

In another embodiment, the composition consists essentially of 0.1-8 wt. % polyvinylpyrrolidone (PVP), 1-9 wt. % acetic acid, 76-99 wt. % water, and 0.1-7 wt. % gum arabic.

In another embodiment, the adhesive composition can comprise water, urea, a binder, an acid, and an oligo- and/or poly-saccharide. In another embodiment, the adhesive composition can comprise 0.1-2.5 wt. % urea, 0.7-2.5 wt. % gelatin, 80-99 wt. % of ~5% aqueous acetic acid, 5-15 wt % of oligo- and/or poly-saccharide, and optionally 0.00001-0.1 wt. % colorant. In another embodiment, the composition can comprise 0.01-10 wt. % urea, 0.05-20 wt. % gelatin, 45-99 wt. % of ~5% aqueous acetic acid, and 0.1-25 wt. % of raw sugar (such as muscovado or turbinado). In another embodiment, the composition can comprise 0.1-4 wt. % urea, 0.1-4 wt. % gelatin, 1-9 wt. % acetic acid, 68-99 wt. % water, and 1-15 wt. % of raw sugar (such as muscovado or turbinado). In further embodiments, the composition can comprise 0.3-1 wt. % urea, 0.5-2 wt. % gelatin, 2-6 wt. % acetic acid, 81-99 wt. % water, and 6-10 wt. % of raw sugar (such as muscovado or turbinado).

In another embodiment, the composition consists essentially of 0.1-4 wt. % urea, 0.1-4 wt. % gelatin, 1-9 wt. % acetic acid, 68-99 wt. % water, and - 15 wt. % of raw sugar (such as muscovado or turbinado).

In another embodiment, the adhesive composition can comprise urea, gelatin, an acid, a glycoprotein or polysaccharide, and PVP. In another embodiment, the adhesive composition can comprise 0.5-4 wt. % urea, 2.5-10 wt. % gelatin, 73-90 wt. % of ~5% aqueous acetic acid, 2.5-10 wt. % gum Arabic, 0.5-3 wt. % PVP, optionally 0.0001-0.001 wt. % colorant and optionally fragrances. In a further embodiment, the adhesive composition can comprise 0.05-7 wt. % urea, 1-15 wt. % gelatin, 58-90 wt. % of ~5% aqueous acetic acid, 1-15 wt. % gum Arabic, 0.1-5 wt. % PVP, optionally 0.0001-001 wt. % colorant and optionally fragrances. In some embodiments, the composition can comprise 0.05-7 wt. % urea, 1-15 wt. % gelatin, 1-8 wt. % acetic acid, 58-90 wt. % water, and 0.1-5 wt. % polyvinylpyrrolidone (PVP). In further embodiments, the composition can comprise 1-4 wt. % urea, 3-9 wt. % gelatin, 2-6 wt. % acetic acid, 84-96 wt. % water, and 0.5-3 wt. % polyvinylpyrrolidone (PVP).

In a still further embodiment, the adhesive composition consists essentially of 0.05-7 wt. % urea, 1-15 wt. % gelatin, 1-8 wt. % acetic acid, 58-90 wt. % water, and 0.1-5 wt. % polyvinylpyrrolidone (PVP).

In another embodiment, the adhesive composition can comprise polyvinyl acetate, polyvinyloxide, PEO or PVP, water, nylon, optionally a glycoprotein or polysaccharide, and optionally an acid. In another embodiment, the polyvinylacetate, polyvinyloxide, PEO, or PVP and the nylon can be present in a mass ratio of 99:1-1:99. In a further embodiment, the adhesive composition can comprise 25-40 wt. % polyvinyl acetate aqueous suspension, 50-75 wt. % water, 1-10 wt. % water soluble polyamide derived from polymerization of a caprolactam monomer and an amine monomer, optionally 0.0001-0.1wt. % colorant, and optionally a trace amount of fragrance. In another embodiment, the adhesive composition can comprise 20-70 wt. % polyvinyl acetate aqueous suspension, polyvinyloxide, PEO, or PVP, 10-70 wt. % water, 0.1-20 wt. % polyamide, optionally 0.0001-0.1 wt. % colorant, and optionally a trace amount of fragrance. In some embodiments, the composition can comprise 28-35 wt. % polyvinyl acetate, 60-70 wt. % water, and 1.5-4 wt. % water soluble polyamide.

In a further embodiment, the adhesive composition consists essentially of 25-40 wt. % polyvinyl acetate aqueous suspension, 50-75 wt. % water, and 1-10 wt. % water soluble polyamide. In another embodiment, the adhesive composition can consist essentially of 20-70 wt. % polyvinyl acetate aqueous suspension, 10-70 wt. % water, and 0.1-20 wt. % water soluble polyamide. In some embodiments, the water soluble polyamide can be derived from polymerization of a caprolactam monomer and an amine monomer.

In another embodiment, the adhesive composition can comprise water, polyacrylic acid, or a derivative or salt or partial salt (for example, sodium or potassium or ammonium salt) thereof, and a polyalkylene. In a further embodiment, the adhesive composition can comprise 10-25% polyacrylic acid, 1-25% wt. % of polypropylene, 50-89 wt. % water, optionally 0.0001-0.1 wt. % colorant, and optionally a trace amount of fragrance. In another embodiment, the adhesive composition can comprise water and 1%-90% wt. % polyacrylic acid, or a derivative or salt thereof, 1-25% wt. % of polyalkylene, and 10-99% wt. % water.

In a yet further embodiment, the adhesive composition consists essentially of 10-25% polyacrylic acid, partial sodium salt, 1-25% wt. % of polypropylene, and 50-89 wt. % water. In some embodiments, polyacrylic acid can be present as a partial sodium salt, with a MW of 5,000 to 350,000. In further embodiments, polyacrylic acid can have a MW of 5,000 to 350,000.

In some embodiments, the composition is selected for printing at 90° C.-130° C., 80-155° C., 0-100° C., 100-155° C., or 60-110° C. bed temperature. In further embodiments, the print bed temperature during printing can be 0-155° C. or 20-155° C.

EXAMPLES

Exemplary embodiments below are for illustrative purposes only, and the scope of the disclosure is not limited to the exemplary embodiments.

Example 1

The adhesive composition is 0.1-2 wt. % polyvinylpyrrolidone (PVP), and 94-99 wt. % of ~5% aqueous acetic acid, and 0.5-4 wt. % gum arabic. All ingredients are mixed thoroughly and the resulting mixture is heated for 10 minutes in a 1 kw microwave. Adhesive compositions according to Example 1 were applied to glass print beds and adhered 3D printed materials to the glass support heated to 80-155° C., including ABS, PET, PLA, SAN, and TPU. Print materials were 175-260° C. during application.

Example 2

The adhesive composition is 0.1-2 wt. % urea, 0.5-4 wt. % gelatin, 80-99 wt. % of ~5% aqueous acetic acid, 5-15 wt % of oligosaccharide (raw sugar such as muscovado or turbinado). All ingredients are mixed thoroughly and the resulting mixture is heated for 25 minutes in a 1 kw microwave. Adhesive compositions according to Example 2 were applied to glass print beds and adhered 3D printed materials to the glass support heated to 0-100° C., including PLA, PLGA, and PCL. Print materials were 175-240° C. during application.

Example 3

The adhesive composition is 0.5-4 wt. % urea, 2.5-10 wt. % gelatin, 75-97 wt. % of ~5% aqueous acetic acid, 0.5-3 wt. % PVP, 0.0001-0.1 wt. % colorant and a trace amount of fragrance. Alternatively, the adhesive composition is 0.5-4 wt. % urea, 2.5-10 wt. % gelatin, 75-97 wt. % of ~5% aqueous acetic acid, 0.1-6 wt. % gum Arabic, 0.5-3 wt. % PVP, 0.0001-0.1 wt. % colorant and a trace amount of fragrance. All ingredients are mixed thoroughly and the resulting mixture is heated for 25 minutes in a 1 kw microwave. Adhesive compositions according to Example 3 were applied to glass print beds and adhered 3D printed materials to the glass support heated to 100-155° C., including ABS, PET, PLA, PC, and PC/ABS. Print materials were 175-315° C. during application.

Example 4

The adhesive composition is 20-40 wt. % polyvinyl acetate aqueous suspension as commercial wood glue, polyvinyloxide, or PEO 50-70 wt. % water, 0.5-5 wt. % water soluble polyamide, 0.0001-0.1 wt. % colorant, and a trace amount of fragrance. Alternatively, the adhesive composition is 25-40 wt. % polyvinyl acetate aqueous suspension, 50-75 wt. % water, 1-5 wt. % water soluble polyamide derived from polymerization of a caprolactam monomer and an amine monomer (supplied by Toray as Nylon AQ A-90), 0.0001-0.1 wt. % colorant, and a trace amount of fragrance. All ingredients are mixed thoroughly and the resulting mixture is heated for 25 minutes in a 1 kw microwave. Adhesive compositions according to Example 4 were applied to glass print beds and adhered 3D printed materials to the glass support heated to 60-110° C., including BridgeTM nylon, 910 Alloy, nylon-6, Nylon 645, Nylon 680, and PCTPE. Print materials were 215-280° C. during application.

Example 5

The adhesive composition is 10-25 wt. % of aqueous 17% wt. % solution of polyacrylic acid, partial sodium salt, with a MW of 5,000 to 350,000, 5-15% wt. % of polypropylene powder, and 55-85 wt. % water. Adhesive compositions according to Example 5 were applied to glass print beds and adhered 3D printed materials to the glass support heated to 90-130° C., including parafins, waxes, and polymers of aliphatic alkane monomer units, such as polypropylene, polyethylene and the derivatives thereof. Print materials were 200-260° C. during application.

Composition Synthesis: General Procedure

The mixture of polyelectrolyte, preservatives, and additives was mixed until a homogenous mixture was obtained in a mixer and then heated to about 80° C. to 120° C. for about 30 minutes. The resulting composition was cooled to room temperature.

The foregoing description has shown, described and pointed out fundamental novel features of adhesive compositions provided herein. The various compositions, methods, procedures, and techniques described above provide a number of ways to carry out the described embodiments and arrangements. Of course, not necessarily all features, objectives or advantages described are required and/or achieved in accordance with any particular embodiment described herein. Also, although the invention has been disclosed in the context of certain embodiments, arrangements and examples, it will be understood by those skilled in the art that the invention extends beyond the specifically disclosed embodiments to other alternative embodiments, combinations, sub-combinations and/or uses, modifications and equivalents thereof. Accordingly, the invention is not intended to be limited by the specific disclosures of the embodiments herein. Moreover, although features may be described above as acting in certain combinations, one or more features from a claimed combination can, in some cases, be excised from the combination, and the combination may be claimed as any subcombination or variation of any subcombination.

What is claimed is:

1. A composition for promoting adhesion between a 3D printed material and a print platform comprising:
   0.05-7 wt. % urea;
   1-15 wt. % gelatin;
   1-8 wt. % acetic acid;
   58-99 wt. % water; and
   0.1-5 wt. % polyvinylpyrrolidone, wherein the weight percentage is with respect to the total weight of the composition.

2. The composition of claim 1, wherein:
   the urea is 1-4 wt. %;
   the gelatin is 3-9 wt. %;
   the acetic acid is 2-6 wt. %;
   the water is 84-96 wt. %; and
   the polyvinylpyrrolidone is 0.5-3 wt. %.

3. The composition of claim 1, further comprising an additive selected from the group consisting of a binder, an expander, a hydolysing agent, a rheology modifier, an adhesive strength modifier, a release modifier, a cross-linking agent, a free radical trapping agent, a stabilizer, a colorant, a fragrance, an acid, guar gum, locust bean gum carob bean gum, xanthan gum, agar, a gelation agent, and an oligosaccharide.

4. The composition of claim 1, further comprising an additive selected from the group consisting of a binder, an expander, a hydolysing agent, and an oligosaccharide.

5. A composition for promoting adhesion between a 3D printed material and a print platform comprising:
   0.1-8 wt. % polyvinylpyrrolidone;
   1-9 wt. % acetic acid;
   85-99 wt. % water; and
   0.1-7 wt. % gum arabic, wherein the weight percentage is with respect to the total weight of the composition.

6. The composition of claim 5, wherein:
   the polyvinylpyrrolidone is 0.2-1 wt. %;
   the acetic acid is 3-7 wt. %;
   the water is 90-97 wt. %; and
   the gum arabic is 0.5-2 wt. %.

7. The composition of claim 5, further comprising an additive selected from the group consisting of a binder, an expander, a hydolysing agent, a rheology modifier, an adhesive strength modifier, a release modifier, a cross-linking agent, a free radical trapping agent, a stabilizer, a colorant, a fragrance, an acid, urea, guar gum, locust bean gum, carob bean gum, xanthan gum, agar, a gelation agent, and an oligosaccharide.

8. The composition of claim 5, further comprising an additive selected from the group consisting of a binder, an expander, a hydolysing agent, and an oligosaccharide.

\* \* \* \* \*